(12) United States Patent
Minami

(10) Patent No.: US 9,933,556 B2
(45) Date of Patent: Apr. 3, 2018

(54) BACKLIGHT DEVICE AND DISPLAY DEVICE HAVING THE SAME

(71) Applicant: SAMSUNG ELECTRONICS CO., LTD., Suwon-si (KR)

(72) Inventor: Katsumi Minami, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 15/133,484

(22) Filed: Apr. 20, 2016

(65) Prior Publication Data

US 2016/0306096 A1    Oct. 20, 2016

(30) Foreign Application Priority Data

Apr. 20, 2015    (KR) .......................... 10-2015-0055020

(51) Int. Cl.
*G02B 6/00* (2006.01)
*F21V 8/00* (2006.01)

(52) U.S. Cl.
CPC ......... *G02B 6/0026* (2013.01); *G02B 6/0068* (2013.01); *G02B 6/0036* (2013.01); *G02B 6/0055* (2013.01); *G02B 6/0058* (2013.01); *G02B 6/0083* (2013.01)

(58) Field of Classification Search
CPC .......................................... G02B 6/00–6/0096
See application file for complete search history.

(56) References Cited

U.S. PATENT DOCUMENTS

| | | | | |
|---|---|---|---|---|
| 9,261,727 B2* | 2/2016 | Yang | ................. | G02F 1/133514 |
| 9,464,769 B2* | 10/2016 | Ninan | ................. | G02B 27/2264 |
| 2009/0080215 A1* | 3/2009 | Anandan | .............. | G02B 6/0036 |
| | | | | 362/606 |
| 2010/0142183 A1* | 6/2010 | Lerenius | .............. | G02B 6/0003 |
| | | | | 362/85 |
| 2010/0208493 A1* | 8/2010 | Choi | .................... | G02B 6/0035 |
| | | | | 362/607 |
| 2011/0051022 A1* | 3/2011 | Kim | ..................... | G02B 6/0053 |
| | | | | 349/15 |
| 2011/0176328 A1* | 7/2011 | Anandan | .............. | G02B 6/0036 |
| | | | | 362/606 |
| 2012/0019744 A1* | 1/2012 | Lee | ..................... | G02B 5/3083 |
| | | | | 349/65 |
| 2012/0075839 A1* | 3/2012 | Takada | ................... | G02B 5/201 |
| | | | | 362/97.1 |
| 2012/0154464 A1* | 6/2012 | Ninan | ................. | G02B 27/2264 |
| | | | | 345/691 |
| 2012/0188473 A1* | 7/2012 | Chang | ................ | G02B 27/2264 |
| | | | | 349/15 |
| 2015/0062490 A1* | 3/2015 | Kwon | ............... | G02F 1/133621 |
| | | | | 349/64 |
| 2016/0161662 A1* | 6/2016 | Jung | .................... | G02B 6/0026 |
| | | | | 362/606 |

FOREIGN PATENT DOCUMENTS

KR    10-2015-0122341 A    11/2015

* cited by examiner

*Primary Examiner* — Christle I Marshall
(74) *Attorney, Agent, or Firm* — Sughrue Mion, PLLC

(57) ABSTRACT

A backlight device includes a light guide plate on which a plurality of different light exiting patterns are formed and a display device. According to the backlight device and the display device, positions at which light is extracted on the light guide plate are changed, and thus, a 3-dimensional image of a high resolution may be provided.

14 Claims, 17 Drawing Sheets

BACKLIGHT DEVICE AND DISPLAY DEVICE HAVING THE SAME

CROSS-REFERENCE TO RELATED APPLICATION

This application claims priority from Korean Patent Application No. 10-2015-0055020, filed on Apr. 20, 2015, in the Korean Intellectual Property Office, the disclosure of which is incorporated herein by reference in its entirety.

BACKGROUND

1. Field

Apparatuses and methods consistent with exemplary embodiments relate to a backlight device configured to provide light to a display panel and a display device having the same.

2. Description of the Related Art

A display device is a device including a display panel configured to display an image, such as a television, a monitor, and the like.

The display device may display a 2-dimensional image through the display panel provided in a flat shape, or the display device may display an image recognizable as a 3-dimensional image by a user.

SUMMARY

According to an aspect of an exemplary embodiment, there is provided a backlight device including: a light source configured to generate light; a first bandpass filter and a second bandpass filter that are alternately disposed in front of the light source, wherein the first bandpass filter is configured to transmit light of a first wavelength range and the second bandpass filter is configured to transmit light of a second wavelength range; and a light guide plate including a light exiting pattern and configured to change a path of the transmitted light and emit the light, wherein the light exiting pattern includes: a first light exiting pattern configured to emit light passed through the first bandpass filter and provide the emitted light to a plurality of viewing points; and a second light exiting pattern configured to emit light passed through the second bandpass filter and provide the emitted light to a plurality of viewing points.

The light guide plate may include: a light incident surface on which the light is incident; a light exiting surface through which the incident light exits; and a reflecting surface facing the light exiting surface, wherein a light exiting pattern configured to exit the incident light and a non-exiting pattern configured to totally reflect the incident light are alternately formed on the reflecting surface.

The light exiting pattern may include the first light exiting pattern and the second light exiting pattern, which are alternately formed.

The light exiting pattern may include: a third bandpass filter configured to transmit light of a specific wavelength; and a reflecting plate configured to reflect light passed through the third bandpass filter.

The first light exiting pattern may include: a third bandpass filter configured to transmit light having the first wavelength range; and a reflecting plate configured to emit light passed through the third bandpass filter and provide to a plurality of viewing points, and the second light exiting pattern may include: a fourth bandpass filter configured to transmit light having the second wavelength range; and a reflecting plate configured to emit light passed through the fourth bandpass filter and provide to a plurality of viewing points.

The backlight device may include a driving power source configured to selectively provide power to the light source.

The driving power source may include: a first driving power source configured to provide a first power to a light source disposed on a rear surface of the first bandpass filter; and a second driving power source configured to provide a second power to a light source disposed on a rear surface of the second bandpass filter, wherein the first driving power source and the second driving power source selectively provide the first power and the second power to the light sources.

The backlight device may include a light source disposed on a rear surface of the reflecting surface of the light guide plate.

According to an aspect of an exemplary embodiment, there is provided a display device including: a light source configured to generate light; a first bandpass filter and a second bandpass filter that are alternately disposed in front of the light source, wherein the first bandpass filter is configured to transmit light of a first wavelength range and the second bandpass filter is configured to transmit light of a second wavelength range; and a light guide plate including a light exiting pattern and configured to change a path of the transmitted light and emit the light, wherein the light exiting pattern includes: a first light exiting pattern configured to emit light passed through the first bandpass filter and provide the emitted light to a plurality of viewing points; and a second light exiting pattern configured to emit light passed through the second bandpass filter and provide the emitted light to a plurality of viewing points.

The light guide plate may include: a light incident surface on which the light is incident; a light exiting surface through which the incident light exits; and a reflecting surface facing the light exiting surface, wherein a light exiting pattern configured to exit the incident light and a non-exiting pattern configured to totally reflect the incident light are alternately formed on the reflecting surface.

The light exiting pattern may include the first light exiting pattern and the second light exiting pattern, which are alternately formed.

The light exiting pattern may include: a third bandpass filter configured to transmit light of a specific wavelength; and a reflecting plate configured to reflect light passed through the third bandpass filter.

The first light exiting pattern may include: a third bandpass filter configured to transmit light having the first wavelength range; and a reflecting plate configured to emit light passed through the third bandpass filter and provide to a plurality of viewing points, and wherein the second light exiting pattern may include: a fourth bandpass filter configured to transmit light having the second wavelength range; and a reflecting plate configured to emit light passed through the fourth bandpass filter and provide to a plurality of viewing points.

The display device may include a driving power source configured to selectively provide power to the light source.

The driving power source may include: a first driving power source configured to provide a first power to a light source disposed on a rear surface of the first bandpass filter; and a second driving power source configured to provide a second power to a light source disposed on a rear surface of the second bandpass filter, wherein the first driving power source and the second driving power source selectively provide the first power and the second power to the light sources.

The display device may include a light source disposed on a rear surface of the reflecting surface of the light guide plate.

According to an aspect of an exemplary embodiment, there is provided a method of providing an image to a display device, the method including: transmitting light having a first wavelength range through a first bandpass filter, and transmitting light having a second wavelength range through a second bandpass filter; redirecting the light according to a wavelength of the light by using a light exiting pattern; and emitting the redirected light to a plurality of viewing points.

The method may include selectively providing a first power to a light source disposed on a rear surface of the first bandpass filter and a second power to a light source disposed on a rear surface of the second bandpass filter.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION

One or more exemplary embodiments are described in detail below with reference to the accompanying drawings.

Although terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items. Expressions such as "at least one of," when preceding a list of elements, modify the entire list of elements and do not modify the individual elements of the list.

A display device, such as a television, a monitor, a display device of a mobile communication terminal, and the like, is a device configured to display an image. Below, for ease of understanding, a television will be used as an example. However, exemplary embodiments are not limited to a television.

Figure 1:
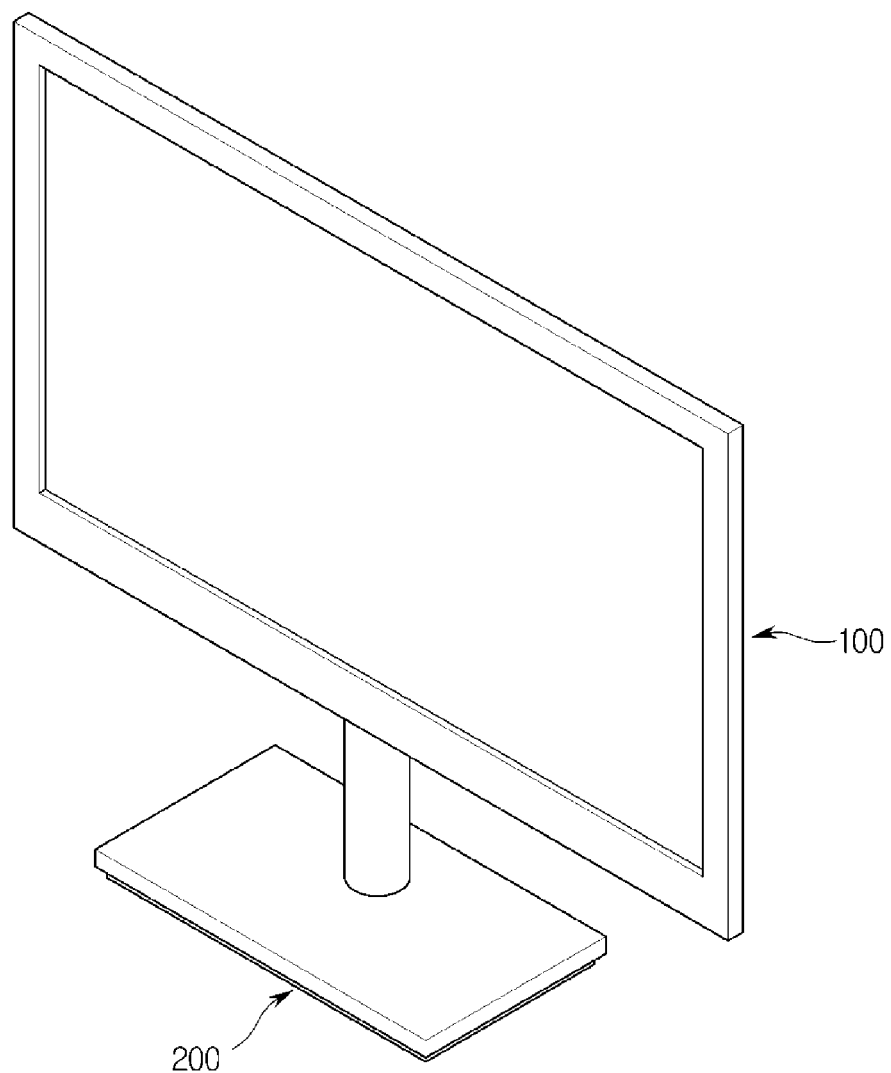
FIG. 1 is view illustrating an exterior of a display device according to an exemplary embodiment.

FIG. 1 is view illustrating an exterior of a display device 100 according to an exemplary embodiment.

The display device 100 displays an image and outputs a sound. According to an exemplary embodiment, the display device 100 may also output the sound through an external device.

The display device 100 may be supported by a stand 200 mounted underneath and may be installed on a wall using a bracket, etc.

The display device 100 may emit light from its display panel or it may provide an image through the display panel by adjusting an amount of transmitted light emitted from a backlight device. Below, a liquid crystal display device 100 configured to provide the image through the display panel by adjusting the amount of the transmitted light emitted from the backlight device will be used as an example.

Figure 2:
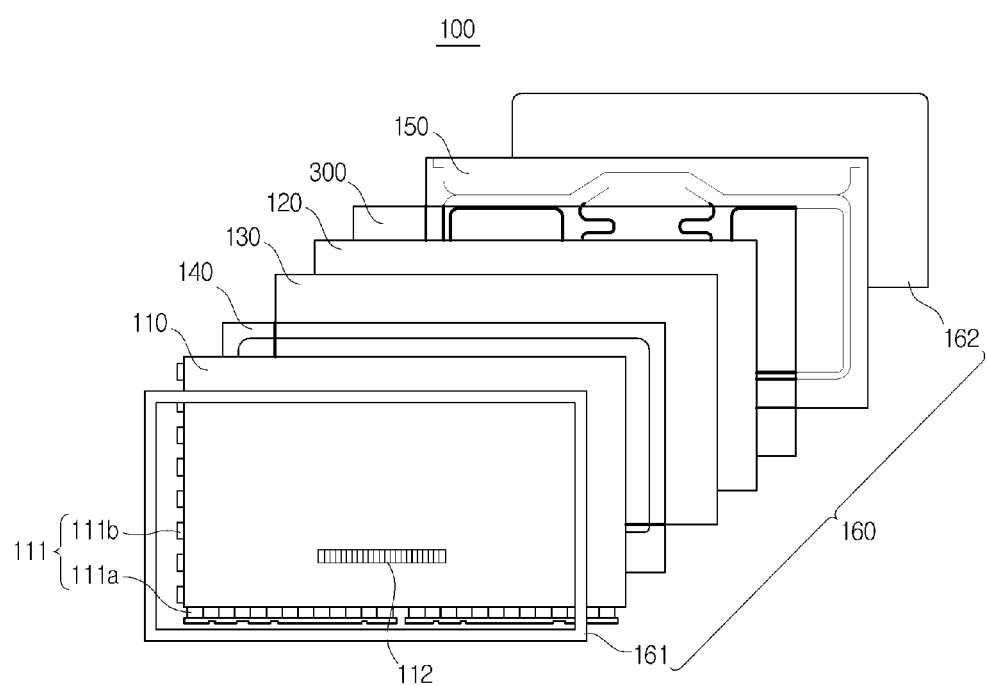
FIG. 2 is an exploded perspective view illustrating a display device according to an exemplary embodiment.

FIG. 2 is an exploded perspective view illustrating the display device 100 according to an exemplary embodiment.

As illustrated in FIG. 2, the liquid crystal display device 100 may include a display panel 110, a diffusion plate 120, an optical sheet 130, a supporting member 140, a chassis 150, a housing 160: front 161, back 162, and a backlight device 300.

The display panel 110 may be configured to adjust a transmittance of light passing through a liquid crystal layer to display image information such as text, number, arbitrary icon, and the like, and the transmittance of the light passing through the liquid crystal layer may be adjusted by an amount of voltage applied thereto.

The display panel 110 may include a thin film transistor (TFT) array panel, a liquid crystal layer, and a sealant.

The TFT array panel of the display panel 110 may include a plurality of gate lines (e.g., scan lines), data lines, and pixel electrodes. The gate lines are aligned in a column direction and transmit gate signals, and the data lines are aligned in a row direction and transmit data lines. Each pixel electrode may be connected to a gate line and a data line and include a switch and a storage capacitor.

The switch may be formed at a crossing point of a gate line and a data line, and the storage capacitor may be connected to an output terminal of the switch. Also, the other terminal of the storage capacitor may be connected to a common voltage or the gate line.

The display panel 110 may include the liquid crystal layer disposed to overlay the TFT array panel, and the liquid crystal layer may include a sealant and liquid crystals sealed by the sealant. Alignment of the liquid crystals in the liquid crystal layer may be changed by an externally applied voltage, and the transmittance of the light passing through the liquid crystal layer may be adjusted.

The sealant is formed on edges of the TFT array panel of the display panel 110, and may be provided to maintain a shape of the display panel 110.

According to an exemplary embodiment, the display panel 110 may include an image driver 111.

The image driving part 111 may include a first driving part 111a configured to drive X electrodes, and a second driving part 111b configured to drive Y electrodes. Here, the X electrodes may be source electrodes, and the Y electrodes may be gate electrodes. The above first driving part 111a and the second driving part 111b may be connected to a driving module.

The first driving part 111a may select a gray-scale voltage for each data line based on image data and transmit the selected gray-scale voltage to the liquid crystals through the data line.

The second driving part 111b may transmit an on-off signal through a scan line to a thin film transistor that is a switch based on image data, and turn on or off the thin film transistor (TFT). In other words, when the first driving part 111a supplies a voltage corresponding to each color value, the second driving part 111b may perform an operation of opening a corresponding pixel 112 by the voltage received therefrom.

The source electrode of a TFT may be coupled with a data line, the gate electrode may be connected to a scan line, and the drain electrode of the TFT may be coupled with a pixel electrode of indium tin oxide (ITO). When a scan signal is supplied to a scan line, the above TFT is turned on and supplies the data signal supplied from the data line to the pixel electrode.

A predetermined voltage may be applied to the common electrode, and thus, an electric field may be formed between the common electrode and the pixel electrode. An alignment angle of liquid crystals in a liquid crystal panel is changed by the above electric field, and due to the change in light transmittance resulting from the changed alignment angle, a desired image may be displayed.

The driving module provides a gate driving signal and a data driving signal based on a gate control signal, a data control signal, a data signal related thereto, etc., to the gate line and the data line formed on the TFT array panel, so that a desired image may be realized on the display panel 110.

The display panel 110 may include a plurality of pixels 112 that are 2-dimensionally arranged to display an image. The pixel 112 may refer to liquid crystals provided at a crossing point between the gate line and the data line. Because the light transmittance of the liquid crystal is changed by the above-described method, a desired color may be displayed on each of the pixels 112, and a combination of colors displayed by the pixels 112 may represent the image displayed on the display panel 110.

The display panel 110 may provide a 2-dimensional image through the plurality of pixels 112, and may also provide a 3-dimensional image using binocular parallax of a user. To realize the 3-dimensional image, the display panel 110 may select any one of a stereoscopic method and an autostereoscopic method.

The stereoscopic method is a method in which glasses are worn, such as polarizing glasses, LC shutter glasses, etc., for viewing a 3-dimensional image. For example, the stereoscopic method is used in a theater for a viewing by multiple persons using a polarization projector.

The autostereoscopic method is a viewing method that does not require special glasses (e.g., naked eyes) by using devices such as a lenticular lens, a parallax barrier, a parallax illumination, and the like. The autostereoscopic method may be found in devices such as a display for games, a home TV, an exhibition display, and the like, for private use or for use by a limited number of people.

Below, for ease of understanding, a case will be described in which a parallax barrier method, among the autostereoscopic methods, is applied.

The diffusion plate 120 may be interposed between the display panel 110 and the backlight device 300. The diffusion plate 120 diffuses light emitted from the backlight device 300 along a surface, so that color and luminance may be uniformly viewable over the entire screen. That is, the diffusion plate 120 diffuses the light emitted from the backlight device 300 and maintains a uniform luminance over the entire surface.

The optical sheet 130 is interposed between the display panel 110 and the diffusion plate 120 and may include a prism sheet, in which prisms are formed, and a reflection type polarizing sheet (e.g., a dual brightness enhancement film; DBEF) by multilayer coatings of birefringence materials.

The prism sheet may include prism patterns of a triangular prism shape, and a plurality of the prism patterns may be adjacently arranged forming a plurality of band shapes. That is, the prism patterns may refer to patterns in which mountains and ridges are repeated in columns and may be formed to protrude from a reference surface toward the display panel 110.

The DBEF re-reflects a portion of light to be absorbed by polarizing plates disposed in front and back of the display panel 110 and redirects the re-reflected light toward the polarizing plates. The DBEF transmits a portion of the incident light and reflects the remaining portion. The reflected light is recycled into scattered light by the diffusion sheet and the prism sheet, and a portion of the recycled scattered light may transmit through the DBEF again. The remaining light is reflected again, and the recycling of the light may be repeated. That is, the DBEF recycles the polarized light that does not pass through the polarizing plate. Thus, the efficiency of the light may be improved. According to an exemplary embodiment, an absorption type polarizing sheet may also be used.

The optical sheet described above improves the optical characteristics of the light emitted from the light guide plate and may provide the light to the display panel 110.

The supporting member 140 may support the display panel 110, the diffusion plate 120, the optical sheet 130, and the light source interposed between a bezel and a cover and maintain a distance between the display panel 110 and the optical sheet 130, a distance between the diffusion plate 120 and the optical sheet 130, and a distance between the diffusion plate 120 and the backlight device 300.

The chassis 150 is a panel configured to connect various parts to display an image and output a sound, and various printed circuit boards, input/output devices, etc., may be mounted on the chassis 150.

The chassis 150 may include a metal having excellent heat dissipation and strength, and a driving module configured to drive the display panel 110, and the backlight may be disposed on the chassis 150.

The housing 160: 161 and 162 may include the bezel and the cover. The bezel fixes the display panel 110 supported by the supporting member 140 and is combined with the supporting member 140 or the cover, capable of separating. When the bezel is combined with the cover, an accommodating space is formed, and the display panel 110, the backlight device 300, the diffusion plate 120, the optical sheet 130, the chassis 150, and the like, may be disposed in the above receiving space.

Below, a structure of a backlight device 300 according to an exemplary embodiment will be described in detail. FIG.

Figure 4:
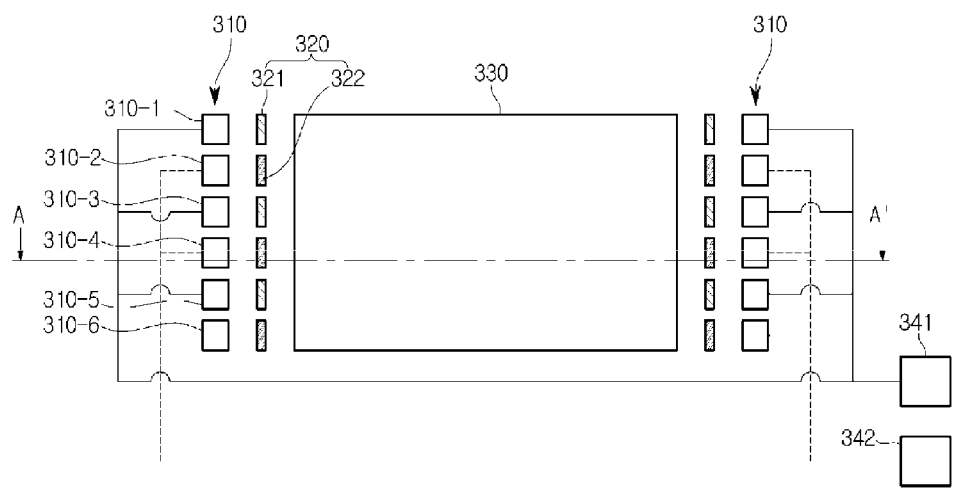
FIG. 4 is a plan view illustrating a structure of a backlight device according to an exemplary embodiment.
Figure 5:
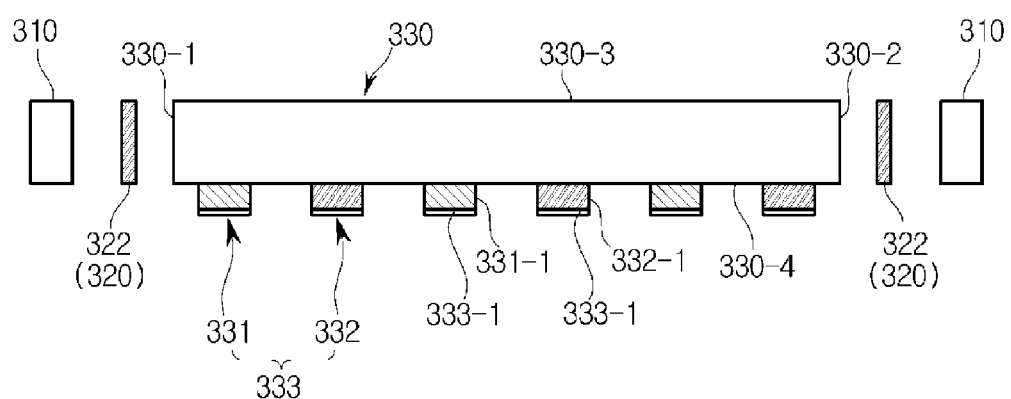
FIG. 5 is a cross-sectional view of the backlight device taken along a line A-A' of FIG. 4.
Figure 6:
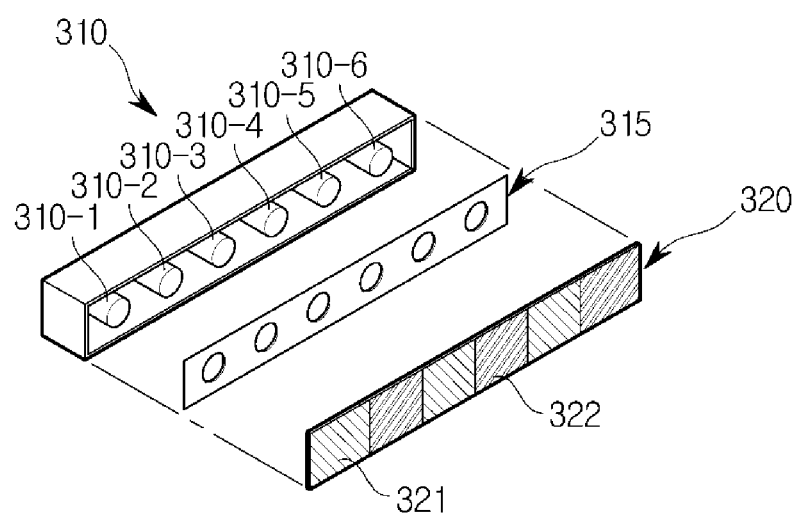
FIG. 6 is an exploded perspective view illustrating a structure of a light source of a backlight device according to an exemplary embodiment.
Figure 7:
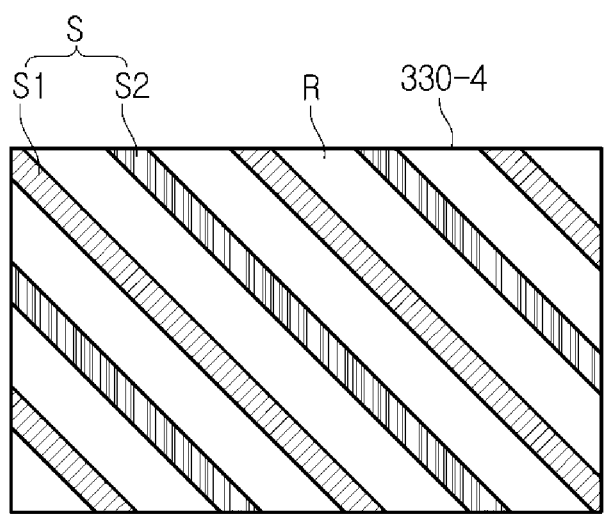
FIG. 7 is an enlarged view illustrating a light exiting pattern of a backlight device according to an exemplary embodiment.

3 is a perspective view illustrating the structure of the backlight device 300 according to an exemplary embodiment, FIG. 4 is a plan view illustrating the structure of the backlight device 300 according to an exemplary embodiment, FIG. 5 is a cross-sectional view of the backlight device 300 taken along a line A-A' shown in FIG. 4, FIG. 6 is an exploded perspective view illustrating a structure of a light source 310 of the backlight device 300 according to an exemplary embodiment, and FIG. 7 is an enlarged view illustrating a light exiting pattern 333 of the backlight device 300 according to an exemplary embodiment.

Figure 3:
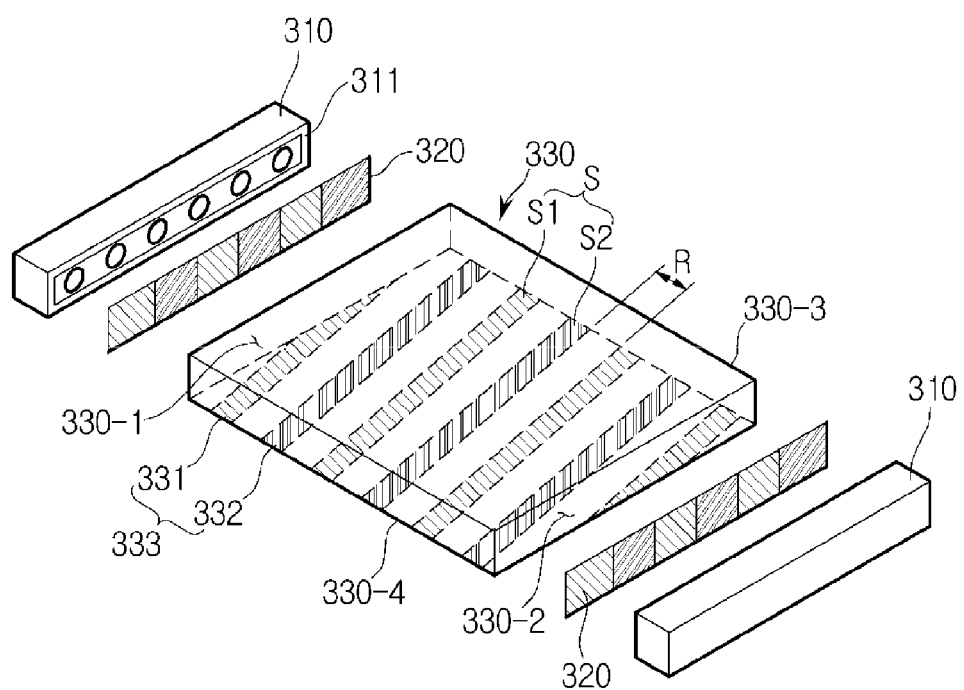
FIG. 3 is a perspective view illustrating a structure of a backlight device according to an exemplary embodiment.

The backlight device 300 is a lighting device configured to emit light. As illustrated in FIGS. 3 to 5, the backlight device 300 according to an exemplary embodiment includes a light source 310 to generate light, a filter 320 to adjust the wavelength of the light generated by the light source 310, and a light guide plate 330 to change the path of the light passed through the filter 320 for exiting toward the display panel 110.

The backlight device 300 according to an exemplary embodiment may be realized as an edge type lighting device. The light source 310 may be disposed on a side surface of the light guide plate 330 as an array of point light sources, and the light generated from the light source 310 may be incident on the light guide plate 330 through the side surface.

The types of the light source 310 may include a cold cathode fluorescent lamp (CCFL), an external electrode fluorescent lamp (EEFL), a light emitting diode (LED), and the like, but is not limited by the aforementioned. When the light emitting diode is used as the light source 310, the light emitting diode may be applied in a package housing a red chip, a green chip and a blue chip, as well as by using red and green fluorescent materials on blue chips according to an exemplary embodiment.

The light source 310 may further include a light source cover 311 having a structure with one open side. The light source cover 311 may emit the light generated from the array of the light source 310 through the open portion, and thus, the light generated from the array of the light source 310 may be transmitted to the light guide plate 330 through the open portion of the light source cover 311.

The filter 320 may be interposed between the light source 310 and the side surface of the light guide plate 330. The filter 320 may definitely be disposed in front of the entire open portion of the light source cover 311, and according to an exemplary embodiment, the filter 320 may function as the light source cover 311. The filter 320 may include a bandpass filter transmitting a specific wavelength or a range of wavelengths. As long as such a bandpass filter has a characteristic of transmitting the specific wavelength, the bandpass filter may either absorb or reflect the remaining wavelengths without consequences.

As described in FIG. 6, first bandpass filters 321 and second bandpass filters 322 may be alternately disposed in front of the light source 310, and the first bandpass filters 321 and the second bandpass filters 322 may transmit light of different wavelength ranges.

According to an example, the first bandpass filter 321 may transmit in a wavelength range of 435 nm/520 nm/615 nm, and the second bandpass filter 322 may transmit in a wavelength range of 450 nm/535 nm/630 nm. The wavelength ranges transmitted by the first bandpass filter 321 and the second bandpass filter 322 are not limited by the above described numerical values and may include all cases of transmitting light of mutually exclusive wavelength ranges.

The light source 310 may be coupled with different driving circuits according to each type of the bandpass filter provided in front thereof. For example, when the light source 310 includes a first light source 310-1, a second light source 310-2, a third light source 310-3, a fourth light source 310-4, a fifth light source 310-5, and a sixth light source 310-6, the first bandpass filters 321 may be provided in front of the first light source 310-1, the third light source 310-3, and the fifth light source 310-5, and the second bandpass filters 322 may be provided in front of the second light source 310-2, the fourth light source 310-4, and the sixth light source 310-6. Also, the first light source 310-1, the third light source 310-3, and the fifth light source 310-5 may be coupled with the first driving circuit and driven by a first driving power source 341, and the second light source 310-2, the fourth light source 310-4, and the sixth light source 310-6 may be coupled with the second driving circuit and driven by a second driving power source 342.

Here, when the first driving power source 341 is changed to the on state, light may be emitted from the first light source 310-1, the third light source 310-3, and the fifth light source 310-5, and the emitted light may pass through the first bandpass filter 321 and be incident on the light guide plate 330. In the same way, when the second driving power source 342 is changed to the on state, light may be emitted from the second light source 310-2, the fourth light source 310-4, and the sixth light source 310-6, and the emitted light may pass through the second bandpass filter 322 and be incident on the light guide plate 330.

The bandpass filter may be provided to correspond to a light exiting pattern 333: 331 and 332 formed on the light guide pattern 330. That is, the bandpass filter may have the characteristics of transmitting light having the same wavelength as the light exiting pattern 333: 331, 332 formed on a reflecting surface 330-4 of the light guide plate 330.

When two kinds of light exiting patterns 333: e.g., 331 and 332, transmitting light of different wavelength ranges, are formed on the light guide plate 330, two kinds of bandpass filters 320: 321 and 322 transmitting light of different wavelength ranges may be alternately disposed. Here, the wavelength ranges of the light transmitted by each of the bandpass filters 320: 321 and 322 may be equal to the wavelength range of the light transmitted by the light exiting pattern 333: 331 and 332. When three or more kinds of light exiting patterns are formed on the light guide plate 330, three or more kinds of bandpass filters may be used. Below, for ease of understanding, a case of using two kinds of bandpass filters 320: 321 and 322 will be described. Exemplary embodiments are not limited to this.

The first and second bandpass filters 321 and 322 may have different transmitting wavelength ranges. Thus, when white light emitted from the light source 310 passes through the first bandpass filter 321 or the second bandpass filter 322, the transmitted white light has mutually different spectral distributions, and the light having different spectral distributions is transmitted to the light guide plate 330.

The light guide plate 330 may have a quadrangular plate shape. The light guide plate 330 may include a first light incident surface 330-1 and a second light incident surface 330-2 on which a light is incident, a light exiting surface 330-3 connecting the first light incident surface 330-1 to the second light incident surface 330-2 and emitting the light, and a reflecting surface 330-4 connecting the first light incident surface 330-1 to the second light incident surface 330-2 and facing the light exiting surface 330-3 through which the light exits.

The first light incident surface 330-1 and the second light incident surface 330-2 may be defined as one of the side surfaces of the light guide plate 330. Because the first light incident surface 330-1 and the second light incident surface 330-2 are provided adjacent to the light source 310, the light generated from the light source 310 may be incident on the light guide plate 330. In FIG. 3, a case in which two light incident surfaces 330-1 and 330-2 are formed on the light guide plate 330 is described, but exemplary embodiments are not limited. For example, one light incident surface may be provided, or three or more light incident surfaces may be provided.

A plurality of light exiting patterns 333 may be formed on the reflecting surface 330-4, and a non-exiting area R may be formed in one area of the reflecting surface 330-4 corresponding to the light exiting patterns 333. As illustrated in FIG. 7, the reflecting surface 330-4 may be divided into the non-exiting area R from which the light incident on the reflecting surface 330-4 is totally reflected and a light exiting area S from which the incident light is reflected to exit, and the light exiting area S may include a first light exiting area S1 from which the light passed through the first bandpass filter 321 is reflected and a second light exiting area S2 from which the light passed the second bandpass filter 322 is reflected. According to an exemplary embodiment, when the types of the bandpass filters 320 are three, three kinds of light exiting areas may be formed.

As illustrated in FIG. 7, the light exiting area S and the non-exiting area R may be formed across the reflecting surface 330-4 with a constant interval. The light exiting area S and the non-exiting area R may be formed across the reflecting surface 330-4 in a sequence of a non-exiting area R/a first light exiting area S1/a non-exiting area R/a second light exiting area S2. Thus, the light incident on the light guide plate 330 is only reflected by the first light exiting area S1 and the second exiting are S2 and exits toward the outside. Exemplary embodiments of forming the plurality of light exiting patterns 333 are not limited to the above, and the plurality of light exiting patterns 333 from which the light is reflected and exits may be realized in various shapes and sizes.

The above light exiting pattern 333 may have a structure in which a bandpass filter configured to transmit light of a specific wavelength and a reflecting plate 333-1 including a diffusive reflection material are stacked. Referring to FIG. 5, the first light exiting pattern 331 may have a structure in which a third bandpass filter 331-1 and a reflecting plate 333-1 are stacked, and the second light exiting pattern 332 may have a structure in which a fourth bandpass filter 332-1 and a reflecting plate 333-1 are stacked.

Each of the third bandpass filter 331-1 and the fourth bandpass filter 332-1 may use a filter of a type transmitting light of a specific wavelength and reflect light of the remaining wavelengths. According to an exemplary embodiment, the filter may also absorb light having a wavelength different from the specific wavelength. Also, the third bandpass filter 331-1 may be provided to transmit light having the same wavelength range as the first bandpass filter 321, and the fourth bandpass filter 332-1 may be provided to transmit light having the same wavelength range as the second bandpass filter 322.

The light passed through the third bandpass filter 331-1 or the fourth bandpass filter 332-2 is reflected and exits in a direction toward the display panel 110. The reflecting plate 333-1 may include a diffusive reflection material, and a material having flat prismatic reflection characteristics and high reflection ratio such as barium sulfate may be used as the diffusive reflection material.

As described above, the backlight device 300 and the display device 100 having the same according to an exemplary embodiment are described. Hereinafter, an operation principle of the above backlight device 300 and the display device 100 will be described in detail.

Figure 8:
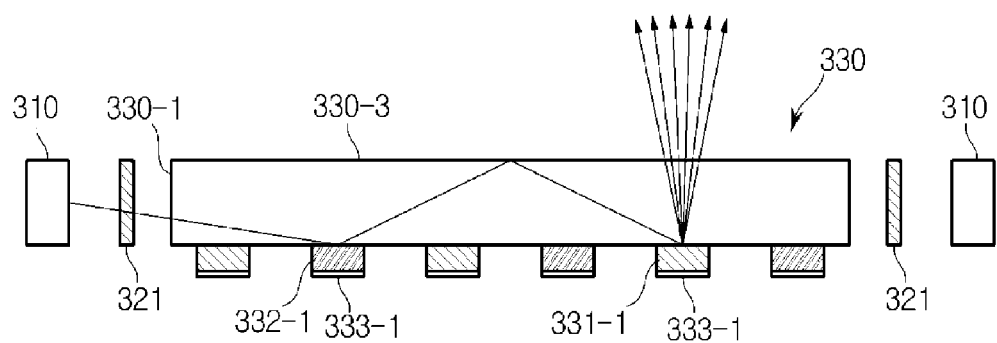
FIGS. 8 and 9 are views illustrating an operation of a backlight device according to an exemplary embodiment.
Figure 9:
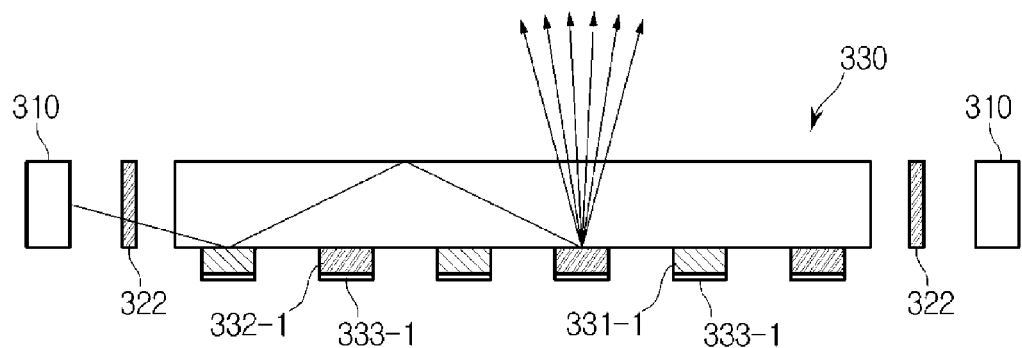

FIGS. 8 and 9 are views illustrating an operation of a backlight device 300 according to an exemplary embodiment. FIG. 8 is a view illustrating a path of light when a first driving power source 341 is changed to the on state, and FIG. 9 is a view illustrating a path of light when a second driving power source 342 is changed to the on state.

As illustrated in FIG. 8, the light generated from the light source 310 passes through the first bandpass filter 321 and is incident on the first light incident surface 330-1 of the light guide plate 330. The light generated from the light source 310 may be white visible light, and the white visible light may pass through the first bandpass filter 321, and may be limited to be within a specific wavelength range. Hereinafter, the light passed through the first bandpass filter 321 is referred to as a first white light.

The first white light incident on the first incident surface 330-1 of the light guide plate may be totally reflected from the light guide plate 330 and arrive at the first light exiting area S1 and the second light exiting area S2. Whereas a transmission wavelength of the first bandpass filter 321 is the same as a transmission wavelength of the third bandpass filter 331-1 that forms the first light exiting pattern 331, a transmission wavelength of the second bandpass filter 322 is the same as a transmission wavelength of the fourth bandpass filter 332-1 that forms the second light exiting pattern 332 as described above.

Thus, when the first white light arrives at the second light exiting area S2, the first white light is reflected from a surface of the second light exiting area S2. Here, an angle of the reflected light is not changed, and the light repeats a total reflection. When the first white light arrives at the first light exiting area S1, the arrived light passes through the third bandpass filter 331-1 and is reflected from the reflecting plate 333-1. Here, the angle of the light may be changed, and thus, the reflected light may be emitted in a direction toward the light exiting surface 330-3 of the light guide plate 330. As a result, the light guide plate 330 may emit the light reflected from the first light exiting area S1 formed on the reflecting surface 330-4 into various viewing points.

Then, as described in FIG. 9, the light generated from the light source 310 may pass through the second bandpass filter 322 and be incident on the first incident surface 330-1 of the light guide plate 330. The white visible light exiting the light source 310 may pass through the second bandpass filter 322 and may be limited to be within a specific wavelength range. Hereinafter, the light passed through the second bandpass filter 322 is described as a second white light.

The second white light incident on a light incident surface of the light guide plate 330 may be totally reflected in the light guide plate 330 and arrive at the first light exiting area S1 and the second light exiting area S2. When the second white light arrives at the first light exiting area S1, the second white light is reflected from a surface in the first light exiting area S1. Here, an angle of the reflected light is not changed, and the light is repeatedly reflected. However, when the light arrives at the second light exiting area S2, the arrived light passes through the fourth bandpass filter 332-1 and is reflected from the reflecting plate 333-1. Here, an angle of the light may be changed, and thus, the reflected light may be emitted in a direction toward the light exiting surface 330-3 of the light guide plate 330. As a result, the light guide plate 330 may emit the light reflected from the second light exiting pattern 332 formed on the reflecting surface 330-4 toward a plurality of viewing points.

In FIGS. 8 and 9, a case in which the reflected light is emitted in six different viewing points is illustrated as an example, but the method of emitting the light is not limited to the above. When each eye of the user is focused on different viewing points among the plurality of viewing points, a binocular parallax may result, and thus, the user may recognize a 3-dimensional image.

Figure 10:
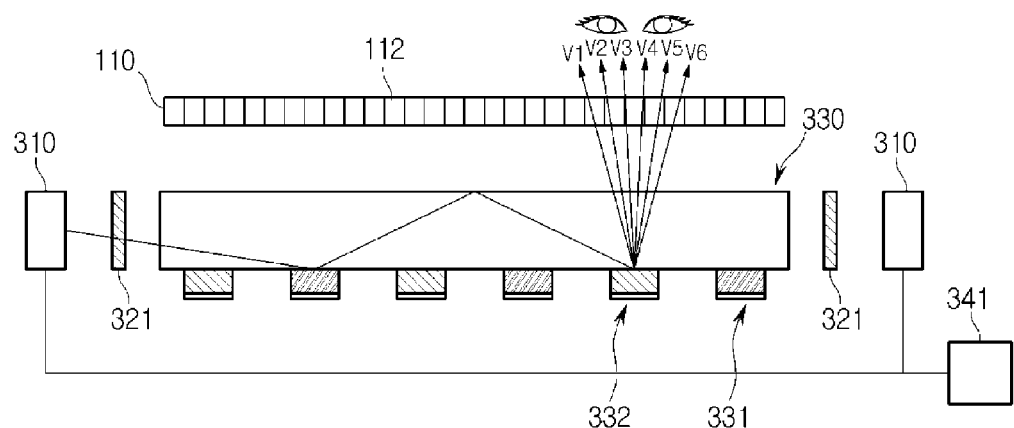
FIGS. 10 and 11 are views illustrating a method of providing a 3-dimensional image and a method of improving a resolution of a display device according to an exemplary embodiment.
Figure 11:
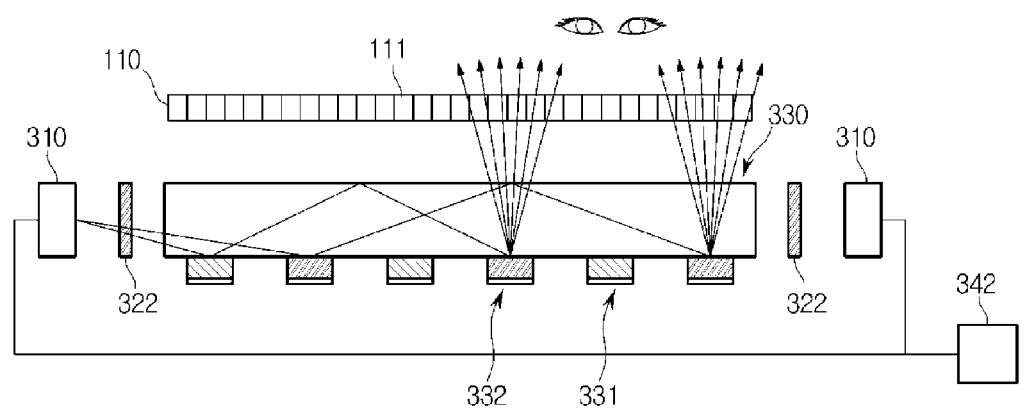

Below, a method of providing a 3-dimensional image of the display device 100 according to an exemplary embodiment and a method of improving a resolution will be described. The display device 100, according to an exemplary embodiment, may turn on the first driving power source 341 or turn on the second driving power source 342 and thus may provide the 3-dimensional image. Also, electric power applied to the light source through the first driving power source 341 and the second driving power source 342 is changed. Thus, a position from which the light exits from the light guide plate may be changed, and the image displayed by the display device is changed based on the change of the light source, thereby improving the resolution of the 3-dimensional image. In FIGS. 10 and 11, the display panel 110 and the backlight device 300 are illustrated.

FIG. 10 is a view illustrating an exemplary embodiment of providing a 3-dimensional image when the first driving power source 341 is changed to the on state. As illustrated in FIG. 10, the light passed through the first bandpass filter 321 and incident on the light guide plate 330 is reflected from the first light exiting pattern 331 and exits in a plurality of viewing points.

The light exiting at the plurality of viewing points may pass through different pixels 112 of the display panel 110. When each eye of the user is focused on different viewing points among viewing points V1 to V6, each eye of the user may recognize the pixel 112 through which the light arrives at each of the viewing points. Thus, the binocular parallax may result, and the user may recognize a 3-dimensional image.

When the 3-dimensional image is provided to the user by the above method, the display device 100 may provide a 3-dimensional image having a resolution lower than that of a 2-dimensional image. The display device 100 may provide the 3-dimensional image at a resolution equaling a resolution of the 2-dimensional image divided by the number of the viewing points, and thus the 3-dimensional image having ⅙ times the resolution of the resolution of the 2-dimensional image may be provided to the display device 100 of FIG. 10.

Thus, the resolution of the display device 100 configured to display the 3-dimensional image is to be improved, and a method of changing the image displayed on the display panel 110 by controlling the above described on/off operation of the driving electric power applied to the light source 310 may be applied.

FIG. 11 is a view illustrating an exemplary embodiment of providing a 3-dimensional image when the second driving power source 342 is changed to the on state, different from FIG. 10. As illustrated in FIG. 11, the light that passes through the second bandpass filter 322 and is incident on the light guide plate 330 may be reflected from the second light exiting pattern 332 and exit at a plurality of viewing points.

The light exiting at different viewing points may pass through different pixels 112 of the display panel 110, and the both eyes of the user may recognize the pixel 112 through which the light arrived at each of the viewing points. Thus, the binocular parallax may result, and thus the user may recognize a 3-dimensional image.

Thus, by changing the on/off of the first driving power source 341 and the second driving power source 342, a 3-dimensional image displayed on the display panel 110 may be changed, and as a result, the resolution of the 3-dimensional image display one the display device 100 may be improved. According to an exemplary embodiment, two kinds of bandpass filters and the light exiting patterns 333 corresponding thereto are provided, two kinds 3-dimensional images are provided, and thus, the resolution of the 3-dimensional image may be improved by two fold. According to an exemplary embodiment, when various kinds of bandpass filters and light exiting patterns 333 corresponding thereto are provided, the resolution of the 3-dimensional image may be greatly improved.

As described above, the structure and the operation principle of the backlight device 300 and the display device 100 according to an exemplary embodiment are illustrated.

Figure 12:
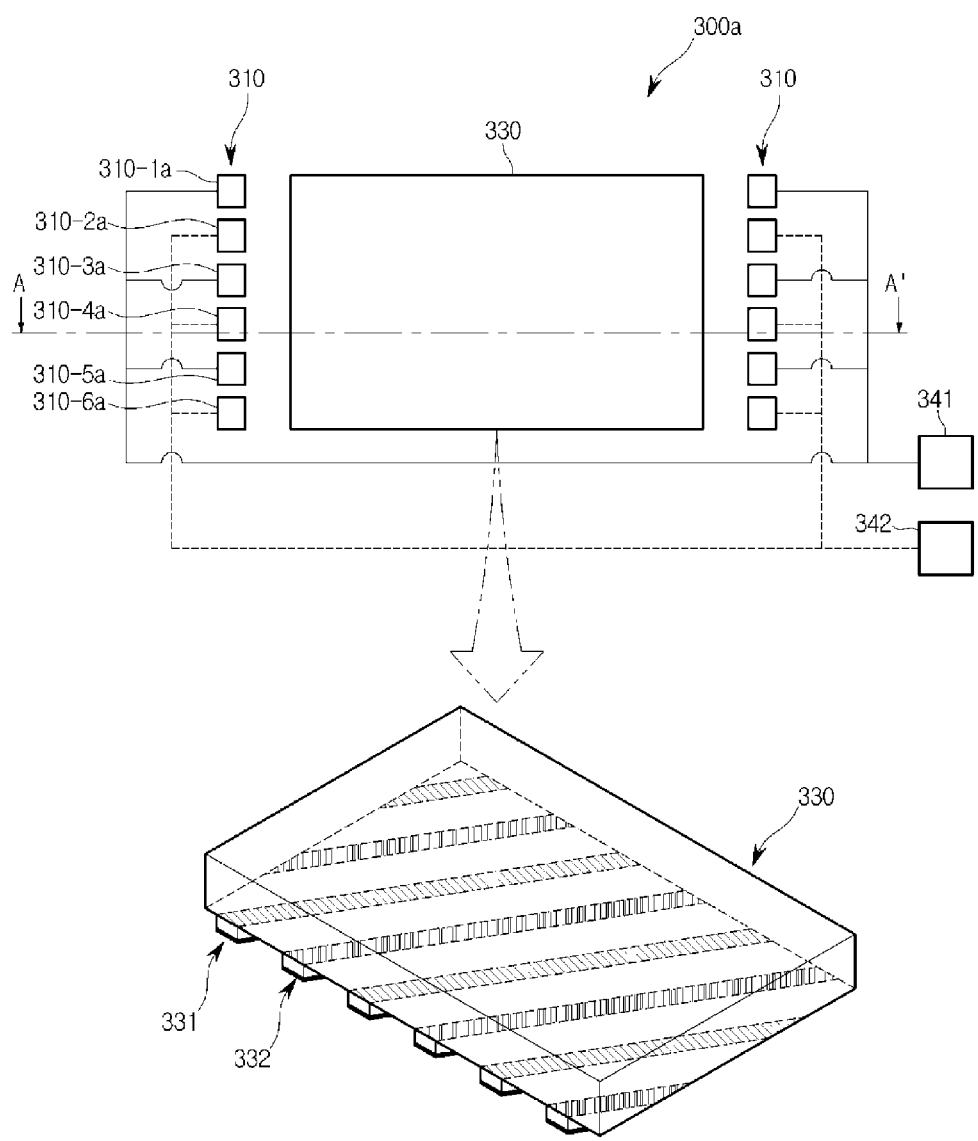
FIG. 12 is a view illustrating a display device according to an exemplary embodiment.

FIG. 12 is a view illustrating a backlight device 300a according to an exemplary embodiment.

As illustrated in FIG. 12, the backlight device 300a according to an exemplary embodiment may not use a bandpass filter between a light source 310 and a light guide plate 330 but may self-emit light of different wavelengths.

For example, the light source 310 may include a first light source 310-1a, a second light source 310-2a, a third light source 310-3a, a fourth light source 310-4a, a fifth light source 310-5a, and a sixth light source 310-6a. In this case, the first light source 310-1a, the third light source 310-3a, and the fifth light source 310-5a may be provided to emit light of a first wavelength, and each thereof may be driven by the first driving power source 341. Also, the second light source 310-2a, the fourth light source 310-4a, and the sixth light source 310-6a may be provided to emit light of a second wavelength, and each thereof may be driven by the second driving power source 342.

When the first driving power source 341 is changed to the on state, the light of the first wavelength may be emitted from the first light source 310-1a, the third light source 310-3a, and the fifth light source 310-5a, and the light of the first wavelength may be reflected by the first light exiting pattern 331 and provide the 3-dimensional image to the display panel 110. By the same principle, when the second driving power source 342 is changed to the on state, the light of the second wavelength may be emitted from the second light source 310-2a, the fourth light source 310-4a, and the sixth light source 310-6a, and the light of the second wavelength may be reflected by the second light exiting pattern 332 and provide the 3-dimensional image to the display panel 110. Thus, based on the on/off change of the first driving power source 341 and the second driving power source 342, the image displayed on the display panel 110 is changed, and the resolution of the 3-dimensional image may be improved. The display device according to an exemplary embodiment may include the above-described backlight device 300a.

Figure 13:
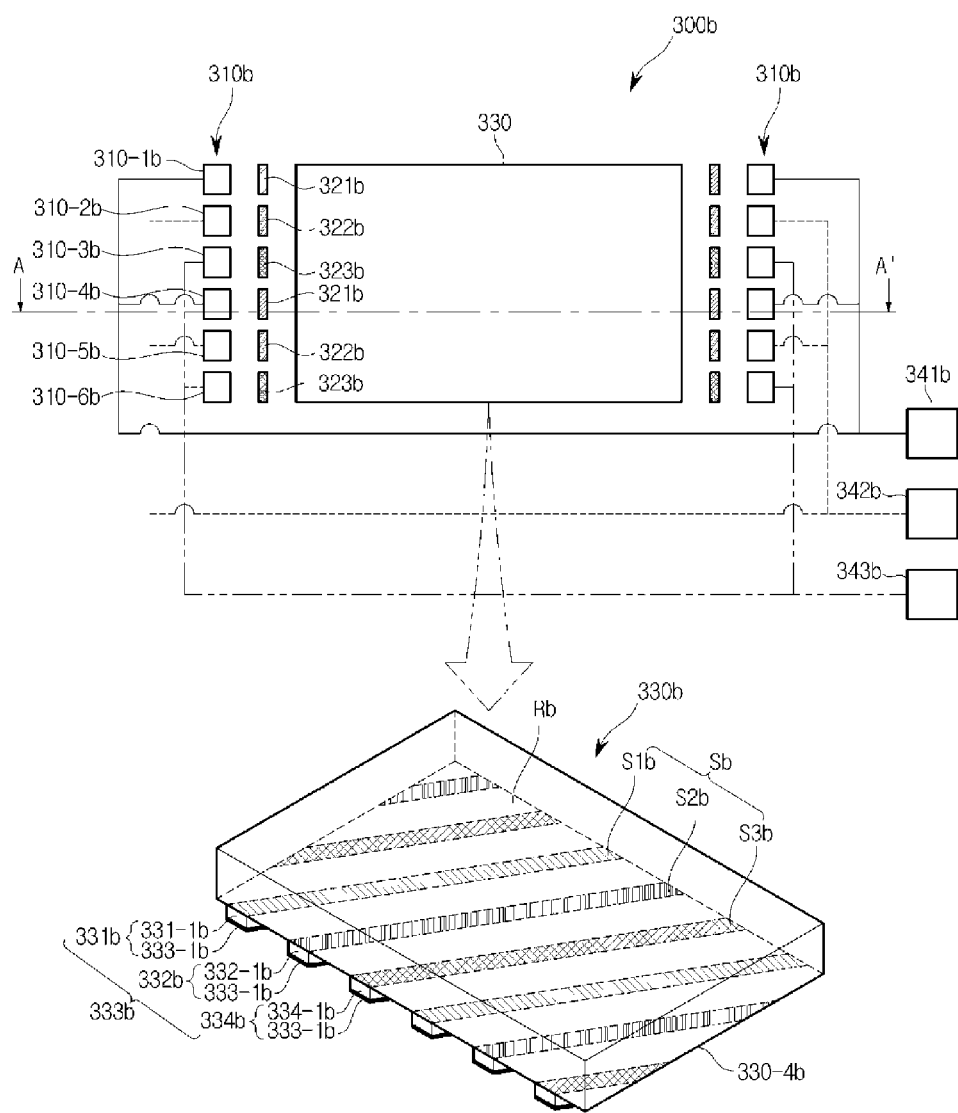
FIG. 13 is a view illustrating a display device according to an exemplary embodiment.

FIG. 13 is a view illustrating a backlight device 300b according to an exemplary embodiment.

As illustrated in FIG. 13, the backlight device 300b according to an exemplary embodiment uses three or more kinds of bandpass filters. Thus, the number of time divisions may be greater than or equal to three.

For example, when a light source 310b includes a first light source 310-1b, a second light source 310-2b, a third light source 310-3b, a fourth light source 310-4b, a fifth light source 310-5b, and a sixth light source 310-6b, a first bandpass filter 321b may be provided in front of the first light source 310-1b and the fourth light source 310-4b, and a second bandpass filter 322b may be provided in front of the second light source 310-2b and the fifth light source 310-5b, and a third bandpass filter 323b may be provided in front of the third light source 310-3b and the sixth light source 310-6b. Also, the first light source 310-1b and the fourth light source 310-4b may be coupled with a first driving circuit and driven by a first driving power source 341b, the second light source 310-2b and the fifth light source 310-5b may be coupled with a second driving circuit and driven by a second driving power source 342b, and the third light source 310-3b and the sixth light source 310-6b may be coupled with a third driving circuit and driven by a third driving power source 343b.

When the first driving power source 341b is changed to the on state, light may exit from the first light source 310-1b and the fourth light source 310-4b, and the exiting light may pass through the first bandpass filter 321b and be incident on the light guide plate 330b. By the same principle, when the second driving power source 342b is changed to the on state, light may exit from the second light source 310-2b and the fifth light source 310-5b, and the exiting light may pass through the second bandpass filter 322b and be incident on the light guide plate 330b, and when the third driving power source 343b is changed to the on state, light may exit from the third light source 310-3b and the sixth light source 310-6b, and the exiting light may pass through the third bandpass filter 323b and be incident on the light guide plate 330b.

A plurality of light exiting patterns 333b corresponding to the first to third bandpass filters 321b, 322b, and 323b may be formed on a reflecting surface 330-4b of the light guide plate 330b. The light incident on the reflecting surface 330-4b may be divided into a non-exiting area Rb from which the incident light is totally reflected in the light guide plate 330b and a light exiting area Sb from which the incident light is reflected to be emitted, and the light exiting area Sb may include a first light exiting area S1b from which the light passed through the first bandpass filter 321b is reflected, a second light exiting area S2b from which the light passed through the second bandpass filter 322b is reflected, and a third light exiting area S3b from which the light passed through the third bandpass filter 323b is reflected. That is, each pair of the first bandpass filter 321b and the first light exiting pattern 331b, the second bandpass filter 322b and the second light exiting pattern 332b, and the third bandpass filter 323b and the third light exiting pattern 334b may transmit the light having the same wavelength range.

Referring to FIG. 13, the light exiting area Sb and the non-exiting area Rb may be formed across a reflecting surface 330-4b at a constant interval. The non-exiting area Rb and the light exiting area Sb may be formed across the reflecting surface 330-4b in a sequence of a non-exiting area Rb/a first light exiting area S1b/a non-exiting area Rb/a second light exiting area S2b/a non-exiting area Rb/a third light exiting area S3b. Thus, the light incident on the light guide plate 330b is only reflected by the first to three light exiting areas Sb: S1b, S2b, and S3b and exits toward the outside.

As described above, the light exiting pattern 333b may have a structure in which bandpass filters 331-1b, 332-1b, and 334-1b configured to transmit light of a specific wavelength and a reflecting plate 333-1 including a diffusive reflection material are stacked. Hereinafter, the first light exiting pattern 331b may have a structure in which a fourth bandpass filter 331-1b and a reflecting plate 333-1b are stacked, and the second light exiting pattern 332b may have a structure in which a fifth reflecting plate 332-1b and a reflecting plate 333-1b are stacked, and the third light exiting pattern 334b may have a structure in which a sixth bandpass filter 334-1b and a reflecting plate 333-1b are stacked. The fourth bandpass filter 331-1b may be provided to transmit light in the same wavelength range as the first bandpass filter 321b, and the fifth bandpass filter 332-1b may be provided to transmit light of the same wavelength range as the second bandpass filter 322b, and the sixth bandpass filter 334-1b may be provided to transmit light of the same wavelength range as the third bandpass filter 323b.

Figure 14:
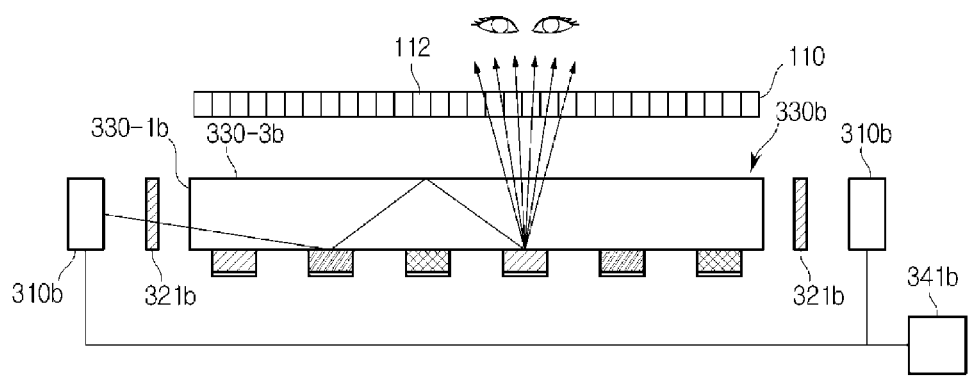
FIGS. 14 to 16 are views illustrating an operation of the backlight device according to an exemplary embodiment.
Figure 15:
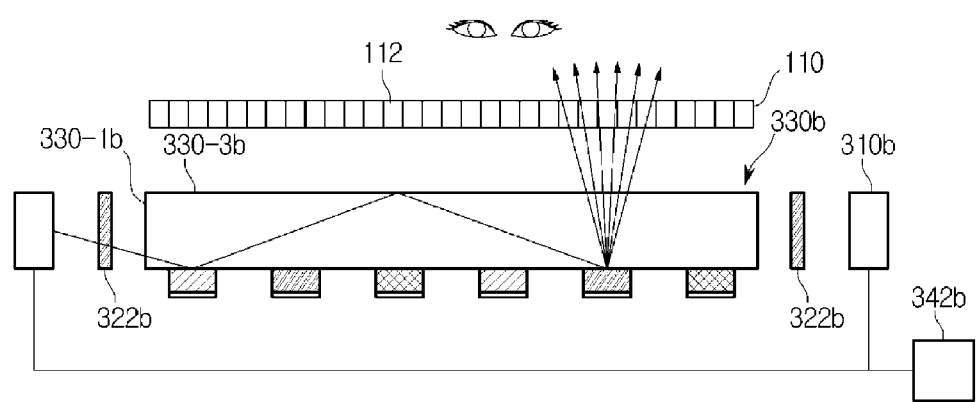
Figure 16:
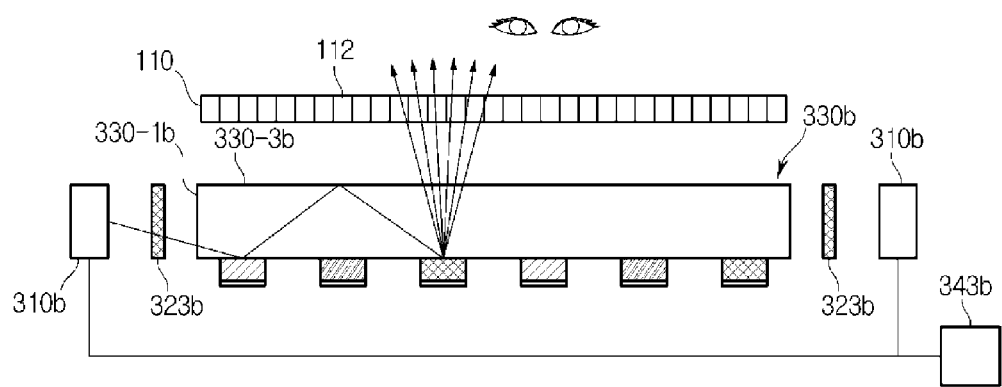

FIGS. 14 to 16 are views illustrating an operation of the backlight device 300b shown in FIG. 13. FIG. 14 is a view illustrating a path of light when the first driving power source 341b is changed to the on state, and FIG. 15 is a view illustrating a path of light when the second driving power source 342b is changed to the on state, and FIG. 16 is a view illustrating a path of light when the third driving power source 343b is changed to the on state.

As illustrated in FIG. 14, the light generated from the light source 310b may pass through the first bandpass filter 321b and be incident on a first light incident surface 330-1b of the light guide plate 330b. The light passed through the first bandpass filter 321b may be polarized into light having a specific wavelength range, and hereinafter, the light passed through the first bandpass filter 321b is defined by a first white light.

The first white light incident on the first incident surface 330-1b of the light guide plate 330b may be totally reflected in the light guide plate 330 and arrive at the first to third light exiting patterns 331b, 332b, and 334b. When the first white light arrives at the second or third light exiting pattern 332b or 334b, the first white light is reflected from a surface of the second or third light exiting pattern 332b or 334b. Here, an angle of the reflected light is not changed, and the light repeats a total reflection. When the first white light arrives at the first light exiting pattern 331b, the arrived light passes through the fourth bandpass filter 331-1b and is reflected from the reflecting plate 333-1b. Here, the angle of the light may be changed, and thus, the reflected light may be emitted in a direction toward the light exiting surface 330-3b of the light guide plate 330b.

In the same way, referring to FIG. 15, when light passed through the second bandpass filter 322b is incident on the second light exiting pattern 332b, the light may pass through the fifth bandpass filter 332-1b that forms the second light exiting pattern 332b and be reflected from the reflecting plate 333-1b and exit in a direction toward the light exiting surface 330-3b of the light guide plate 330b. Also, as described in FIG. 16, when the light passed through the third bandpass filter 323b is incident on the third light exiting pattern 334b, the light may pass through the sixth bandpass filter 334-1b that forms the third light exiting pattern 334b and be reflected from the reflecting plate 333-1b and exit in the direction toward the light exiting surface 330-3b of the light guide plate 330b.

In an exemplary embodiment, the number of time division is three, based on a time of the on/off change of the first to third driving power sources 341b, 342b, and 343b, an image displayed on the display panel 110 is changed, thereby improving a resolution of a 3-dimensional image.

The display device may selectively provide the 3-dimensional image and the 2-dimensional image. For the above-described, the display device may further include a separate light source configured to sequentially generate light of different colors and the light may be emitted throughout an entire reflecting surface of the light guide plate.

Figure 17:
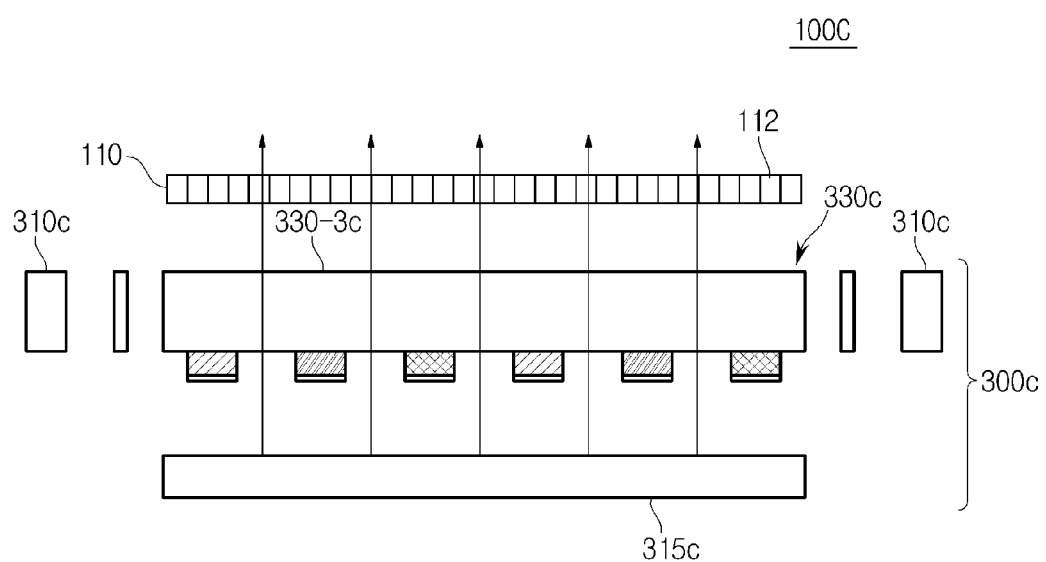
FIG. 17 is a view illustrating a display device according to an exemplary embodiment.

FIG. 17 is a view illustrating a display device 100c according to an exemplary embodiment. In FIG. 17, a display panel 110 and a backlight device 300c are described.

A light guide plate 330c of the display device 100c may include a plurality of light exiting patterns 333c to cause a binocular parallax. When an area in which light is provided and an area in which the light is not provided are repeatedly generated, and thus, pixels 112 recognized by each eye of a user are different, a 3-dimensional image may be recognized.

When a 2-dimensional image is provided, light is to be uniformly emitted on an entire surface of a light exiting surface 330-3c of the light guide plate 330c. For the above-described, an additional light source 315c may be installed on a rear surface of the light guide plate 330c. Hereinafter, to distinguish from a light source 310c disposed on a side surface of the light guide plate 330c, the light source 310c disposed on the side surface of the light guide plate 330c is referred to as a first light source 310c, and the light source 315c disposed on the rear surface of the light guide plate 330c is referred to as a second light source 315c.

Light generated from the first light source 310c may be incident on a reflecting surface 330-4c of the light guide plate 330c and exits toward the display panel through the light exiting surface 330-3c. Thus, both eyes of the user may recognize all pixels 112 of the display panel 110, and a 2-dimensional image may be provided on the display panel 110.

As described above, the backlight device 300 and the display device 100 including the same according to exemplary embodiments are described. Although one or more exemplary embodiments have been shown and described, it should be appreciated by those skilled in the art that changes may be made to these exemplary embodiments without departing from the principles and spirit of the invention, the scope of which is defined in the claims and their equivalents.

According to a backlight device and a display device having the same, a 3-dimensional image of a high resolution may be provided by changing a position of a light guide plate at which light is extracted.

What is claimed is:
1. A backlight device comprising:
a light source configured to generate light;
a first bandpass filter and a second bandpass filter that are alternately disposed in front of the light source, wherein the first bandpass filter is configured to transmit light of a first wavelength range and the second bandpass filter is configured to transmit light of a second wavelength range; and
a light guide plate comprising a light exiting pattern and configured to change a path of the transmitted light and emit the light,
wherein the light exiting pattern comprises:
a first light exiting pattern configured to emit light passed through the first bandpass filter and provide the emitted light to a plurality of viewing points; and
a second light exiting pattern configured to emit light passed through the second bandpass filter and provide the emitted light to a plurality of viewing points,
wherein the light guide plate further comprises:
a light incident surface on which the light is incident;
a light exiting surface through which the incident light exits; and
a reflecting surface facing the light exiting surface,
wherein a light exiting pattern configured to exit the incident light and a non-exiting pattern configured to totally reflect the incident light are alternately formed on the reflecting surface.

2. The backlight device of claim 1, wherein the light exiting pattern comprises the first light exiting pattern and the second light exiting pattern, which are alternately formed.

3. The backlight device of claim 1, wherein the light exiting pattern comprises:
a third bandpass filter configured to transmit light of a specific wavelength; and
a reflecting plate configured to reflect light passed through the third bandpass filter.

4. The backlight device of claim 1, wherein the first light exiting pattern comprises:
a third bandpass filter configured to transmit light having the first wavelength range; and
a reflecting plate configured to emit light passed through the third bandpass filter and provide to a plurality of viewing points,
wherein the second light exiting pattern comprises:
a fourth bandpass filter configured to transmit light having the second wavelength range; and
a reflecting plate configured to emit light passed through the fourth bandpass filter and provide to a plurality of viewing points.

5. The backlight device of claim 1, further comprising a driving power source configured to selectively provide power to the light source.

6. The backlight device of claim 5, wherein the driving power source comprises:
a first driving power source configured to provide a first power to a light source disposed on a rear surface of the first bandpass filter; and
a second driving power source configured to provide a second power to a light source disposed on a rear surface of the second bandpass filter,
wherein the first driving power source and the second driving power source selectively provide the first power and the second power to the light sources.

7. The backlight device of claim 1, further comprising a light source disposed on a rear surface of the reflecting surface of the light guide plate for light that is uniformly emitted on an entire surface of the light exiting surface of the light guide plate.

8. A display device comprising:
a light source configured to generate light;
a first bandpass filter and a second bandpass filter that are alternately disposed in front of the light source, wherein the first bandpass filter is configured to transmit light of a first wavelength range and the second bandpass filter is configured to transmit light of a second wavelength range; and
a light guide plate comprising a light exiting pattern and configured to change a path of the transmitted light and emit the light,
wherein the light exiting pattern comprises:
a first light exiting pattern configured to emit light passed through the first bandpass filter and provide the emitted light to a plurality of viewing points; and
a second light exiting pattern configured to emit light passed through the second bandpass filter and provide the emitted light to a plurality of viewing points, wherein the light guide plate further comprises:
- a light incident surface on which the light is incident;
- a light exiting surface through which the incident light exits; and
- a reflecting surface facing the light exiting surface,
- wherein a light exiting pattern configured to exit the incident light and a non-exiting pattern configured to totally reflect the incident light are alternately formed on the reflecting surface.

9. The display device of claim 8, wherein the light exiting pattern comprises the first light exiting pattern and the second light exiting pattern, which are alternately formed.

10. The display device of claim 8, wherein the light exiting pattern comprises:
- a third bandpass filter configured to transmit light of a specific wavelength; and
- a reflecting plate configured to reflect light passed through the third bandpass filter.

11. The display device of claim 8, wherein the first light exiting pattern comprises:
- a third bandpass filter configured to transmit light having the first wavelength range; and
- a reflecting plate configured to emit light passed through the third bandpass filter and provide to a plurality of viewing points, wherein the second light exiting pattern comprises:
- a fourth bandpass filter configured to transmit light having the second wavelength range; and
- a reflecting plate configured to emit light passed through the fourth bandpass filter and provide to a plurality of viewing points.

12. The display device of claim 8, further comprising a driving power source configured to selectively provide power to the light source.

13. The display device of claim 12, wherein the driving power source comprises:
- a first driving power source configured to provide a first power to a light source disposed on a rear surface of the first bandpass filter; and
- a second driving power source configured to provide a second power to a light source disposed on a rear surface of the second bandpass filter,
- wherein the first driving power source and the second driving power source selectively provide the first power and the second power to the light sources.

14. The display device of claim 8, further comprising a light source disposed on a rear surface of the reflecting surface of the light guide plate for light that is uniformly emitted on an entire surface of the light exiting surface of the light guide plate.

* * * * *